United States Patent
Master et al.

(10) Patent No.: US 7,602,740 B2
(45) Date of Patent: Oct. 13, 2009

(54) SYSTEM FOR ADAPTING DEVICE STANDARDS AFTER MANUFACTURE

(75) Inventors: Paul L. Master, Sunnyvale, CA (US); John Watson, Edgewood, WA (US)

(73) Assignee: QST Holdings, Inc., San Jose, CA (US)

( * ) Notice: Subject to any disclaimer, the term of this patent is extended or adjusted under 35 U.S.C. 154(b) by 1390 days.

(21) Appl. No.: 10/013,825

(22) Filed: Dec. 10, 2001

(65) Prior Publication Data

US 2004/0028082 A1    Feb. 12, 2004

(51) Int. Cl.
    *H04B 1/44*    (2006.01)
(52) U.S. Cl. ....................... 370/282; 455/418
(58) Field of Classification Search ............... 370/282; 455/418
    See application file for complete search history.

(56) References Cited

U.S. PATENT DOCUMENTS

| | | |
|---|---|---|
| 3,409,175 A | 11/1968 | Byrne |
| 3,665,171 A | 5/1972 | Morrow |
| 3,666,143 A | 5/1972 | Weston |
| 3,938,639 A | 2/1976 | Birrell |
| 3,949,903 A | 4/1976 | Benasutti et al. |
| 3,960,298 A | 6/1976 | Birrell |
| 3,967,062 A | 6/1976 | Dobias |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |
| 4,181,242 A | 1/1980 | Zygiel et al. |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |

(Continued)

FOREIGN PATENT DOCUMENTS

DE    100 18 374 A1    10/2001

(Continued)

OTHER PUBLICATIONS

Altera Apex 20K 1999.

(Continued)

*Primary Examiner*—Jason E Mattis
(74) *Attorney, Agent, or Firm*—Nixon Peabody LLP (57) ABSTRACT

A system for efficient sale of devices that comply with licensed standards. A preferred embodiment of the invention uses a generic, or highly adaptable, hardware device. The device can be adapted to adhere to a specific standard, e.g., code-division multiple access, time-division multiple access, etc., after manufacture such as at the point-of-sale to an end user, prior to distribution, or at some other point in a distribution and sales network. This allows manufacturers, retailers and end users to benefit from more competitive selection of standardized communication, data and other formats. Reduction of manufacturing costs and elimination of shipping, or other transfer and storage costs, is also realized.

20 Claims, 3 Drawing Sheets

U.S. PATENT DOCUMENTS

| | | |
|---|---|---|
| 4,354,613 A | 10/1982 | Desai et al. |
| 4,377,246 A | 3/1983 | McMillin et al. |
| 4,380,046 A | 4/1983 | Fung |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,758,985 A | 7/1988 | Carter |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,870,302 A | 9/1989 | Freeman |
| 4,901,887 A | 2/1990 | Burton |
| 4,905,231 A | 2/1990 | Leung et al. |
| 4,921,315 A | 5/1990 | Metcalfe et al. |
| 4,930,666 A | 6/1990 | Rudick |
| 4,932,564 A | 6/1990 | Austin et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,099,418 A | 3/1992 | Pian et al. |
| 5,129,549 A | 7/1992 | Austin |
| 5,139,708 A | 8/1992 | Scott |
| 5,144,166 A | 9/1992 | Camarota et al. |
| 5,156,301 A | 10/1992 | Hassell et al. |
| 5,156,871 A | 10/1992 | Goulet et al. |
| 5,165,023 A | 11/1992 | Gifford |
| 5,165,575 A | 11/1992 | Scott |
| 5,177,700 A | 1/1993 | Göckler |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,218,240 A | 6/1993 | Camarota et al. |
| 5,240,144 A | 8/1993 | Feldman |
| 5,245,227 A | 9/1993 | Furtek et al. |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,325,525 A | 6/1994 | Shan et al. |
| 5,335,276 A | 8/1994 | Thompson et al. |
| 5,336,950 A | 8/1994 | Popli et al. |
| 5,339,428 A | 8/1994 | Burmeister et al. |
| 5,343,716 A | 9/1994 | Swanson et al. |
| 5,361,362 A | 11/1994 | Benkeser et al. |
| 5,367,651 A | 11/1994 | Smith et al. |
| 5,367,687 A | 11/1994 | Tarsy et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,062 A | 2/1995 | Knutson |
| 5,388,212 A | 2/1995 | Grube et al. |
| 5,392,960 A | 2/1995 | Kendt et al. |
| 5,437,395 A | 8/1995 | Bull et al. |
| 5,450,557 A | 9/1995 | Kopp et al. |
| 5,454,406 A | 10/1995 | Rejret et al. |
| 5,465,368 A | 11/1995 | Davidson et al. |
| 5,475,856 A | 12/1995 | Kogge |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A | 1/1997 | Cantone et al. |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,619,695 A | 4/1997 | Arbabi et al. |
| 5,623,545 A | 4/1997 | Childs et al. |
| 5,625,669 A * | 4/1997 | McGregor et al. .......... 455/418 |
| 5,626,407 A | 5/1997 | Westcott |
| 5,630,206 A | 5/1997 | Urban et al. |
| 5,635,940 A | 6/1997 | Hickman et al. |
| 5,646,544 A | 7/1997 | Iadanza |
| 5,646,545 A | 7/1997 | Trimberger et al. |
| 5,647,512 A | 7/1997 | de Oliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,398 A | 12/1997 | Glier et al. |

| | | | | | | |
|---|---|---|---|---|---|---|
| 5,701,482 | A | 12/1997 | Harrison et al. | 5,959,811 A | 9/1999 | Richardson |
| 5,704,053 | A | 12/1997 | Santhanam | 5,959,881 A | 9/1999 | Trimberger et al. |
| 5,706,191 | A | 1/1998 | Bassett et al. | 5,963,048 A | 10/1999 | Harrison et al. |
| 5,706,976 | A | 1/1998 | Purkey | 5,966,534 A | 10/1999 | Cooke et al. |
| 5,712,996 | A | 1/1998 | Schepers | 5,970,254 A | 10/1999 | Cooke et al. |
| 5,720,002 | A | 2/1998 | Wang | 5,987,105 A | 11/1999 | Jenkins et al. |
| 5,721,693 | A | 2/1998 | Song | 5,987,611 A | 11/1999 | Freund |
| 5,721,854 | A | 2/1998 | Ebicioglu et al. | 5,991,302 A | 11/1999 | Berl et al. |
| 5,729,754 | A | 3/1998 | Estes | 5,991,308 A | 11/1999 | Fuhrmann et al. |
| 5,732,563 | A | 3/1998 | Bethuy et al. | 5,993,739 A | 11/1999 | Lyon |
| 5,734,808 | A | 3/1998 | Takeda | 5,999,734 A | 12/1999 | Willis et al. |
| 5,737,631 | A | 4/1998 | Trimberger | 6,005,943 A | 12/1999 | Cohen et al. |
| 5,742,180 | A | 4/1998 | DeHon et al. | 6,006,249 A | 12/1999 | Leong |
| 5,742,821 | A | 4/1998 | Prasanna | 6,016,395 A | 1/2000 | Mohamed |
| 5,745,366 | A | 4/1998 | Highma et al. | 6,021,186 A | 2/2000 | Suzuki et al. |
| RE35,780 | E | 5/1998 | Hassell et al. | 6,021,492 A | 2/2000 | May |
| 5,751,295 | A | 5/1998 | Becklund et al. | 6,023,742 A | 2/2000 | Ebeling et al. |
| 5,754,227 | A | 5/1998 | Fukuoka | 6,023,755 A | 2/2000 | Casselman |
| 5,758,261 | A | 5/1998 | Wiedeman | 6,028,610 A | 2/2000 | Deering |
| 5,768,561 | A | 6/1998 | Wise | 6,036,166 A | 3/2000 | Olson |
| 5,778,439 | A | 7/1998 | Trimberger et al. | 6,039,219 A | 3/2000 | Bach et al. |
| 5,784,636 | A | 7/1998 | Rupp | 6,041,322 A | 3/2000 | Meng et al. |
| 5,787,237 | A | 7/1998 | Reilly | 6,041,970 A | 3/2000 | Vogel |
| 5,790,817 | A | 8/1998 | Asghar et al. | 6,046,603 A | 4/2000 | New |
| 5,791,517 | A | 8/1998 | Avital | 6,047,115 A | 4/2000 | Mohan et al. |
| 5,791,523 | A | 8/1998 | Oh | 6,052,600 A | 4/2000 | Fette et al. |
| 5,794,062 | A | 8/1998 | Baxter | 6,055,314 A | 4/2000 | Spies et al. |
| 5,794,067 | A | 8/1998 | Kadowaki | 6,056,194 A | 5/2000 | Kolls |
| 5,802,055 | A | 9/1998 | Krein et al. | 6,059,840 A | 5/2000 | Click, Jr. |
| 5,818,603 | A | 10/1998 | Motoyama | 6,061,580 A | 5/2000 | Altschul et al. |
| 5,819,255 | A | 10/1998 | Celis et al. | 6,073,132 A | 6/2000 | Gehman |
| 5,822,308 | A | 10/1998 | Weigand et al. | 6,076,174 A | 6/2000 | Freund |
| 5,822,313 | A | 10/1998 | Malek et al. | 6,078,736 A | 6/2000 | Guccione |
| 5,822,360 | A | 10/1998 | Lee et al. | 6,085,740 A | 7/2000 | Ivri et al. |
| 5,828,858 | A | 10/1998 | Athanas et al. | 6,088,043 A | 7/2000 | Kelleher et al. |
| 5,829,085 | A | 11/1998 | Jerg et al. | 6,091,263 A | 7/2000 | New et al. |
| 5,835,753 | A | 11/1998 | Witt | 6,091,765 A | 7/2000 | Pietzold, III et al. |
| 5,838,165 | A | 11/1998 | Chatter | 6,094,065 A | 7/2000 | Tavana et al. |
| 5,845,815 | A | 12/1998 | Vogel | 6,094,726 A | 7/2000 | Gonion et al. |
| 5,860,021 | A | 1/1999 | Klingman | 6,111,893 A | 8/2000 | Volftsun et al. |
| 5,862,961 | A | 1/1999 | Motta et al. | 6,111,935 A | 8/2000 | Hughes-Hartogs |
| 5,870,427 | A | 2/1999 | Tiedemann, Jr. et al. | 6,112,218 A | 8/2000 | Gandhi et al. |
| 5,873,045 | A | 2/1999 | Lee et al. | 6,115,751 A | 9/2000 | Tam et al. |
| 5,881,106 | A | 3/1999 | Cartier | 6,119,178 A | 9/2000 | Martin et al. |
| 5,884,284 | A | 3/1999 | Peters et al. | 6,120,551 A | 9/2000 | Law et al. |
| 5,886,537 | A | 3/1999 | Macias et al. | 6,122,670 A | 9/2000 | Bennett et al. |
| 5,887,174 | A | 3/1999 | Simons et al. | 6,128,307 A | 10/2000 | Brown |
| 5,889,816 | A | 3/1999 | Agrawal et al. | 6,134,605 A | 10/2000 | Hudson et al. |
| 5,889,989 | A | 3/1999 | Robertazzi et al. | 6,138,693 A | 10/2000 | Matz |
| 5,890,014 | A | 3/1999 | Long | 6,141,283 A | 10/2000 | Bogin et al. |
| 5,892,900 | A | 4/1999 | Ginter et al. | 6,150,838 A | 11/2000 | Wittig et al. |
| 5,892,961 | A | 4/1999 | Trimberger | 6,154,494 A | 11/2000 | Sugahara et al. |
| 5,892,962 | A | 4/1999 | Cloutier | 6,157,997 A | 12/2000 | Oowaki et al. |
| 5,894,473 | A | 4/1999 | Dent | 6,173,389 B1 | 1/2001 | Pechanek et al. |
| 5,901,884 | A | 5/1999 | Goulet et al. | 6,175,854 B1 | 1/2001 | Bretscher |
| 5,903,886 | A | 5/1999 | Heimlich et al. | 6,175,892 B1 | 1/2001 | Sazzad et al. |
| 5,907,285 | A | 5/1999 | Toms et al. | 6,181,981 B1 | 1/2001 | Varga et al. |
| 5,907,580 | A | 5/1999 | Cummings | 6,185,418 B1 | 2/2001 | MacLellan et al. |
| 5,910,733 | A | 6/1999 | Bertolet et al. | 6,192,070 B1 | 2/2001 | Poon et al. |
| 5,912,572 | A | 6/1999 | Graf, III | 6,192,255 B1 | 2/2001 | Lewis et al. |
| 5,913,172 | A | 6/1999 | McCabe et al. | 6,192,388 B1 | 2/2001 | Cajolet |
| 5,917,852 | A | 6/1999 | Butterfield et al. | 6,195,788 B1 | 2/2001 | Leaver et al. |
| 5,920,801 | A | 7/1999 | Thomas et al. | 6,198,924 B1 | 3/2001 | Ishii et al. |
| 5,931,918 | A | 8/1999 | Row et al. | 6,199,181 B1 | 3/2001 | Rechef et al. |
| 5,933,642 | A | 8/1999 | Greenbaum et al. | 6,202,130 B1 | 3/2001 | Scales, III et al. |
| 5,940,438 | A * | 8/1999 | Poon et al. .................. 375/222 | 6,202,189 B1 | 3/2001 | Hinedi et al. |
| 5,949,415 | A | 9/1999 | Lin et al. | 6,219,697 B1 | 4/2001 | Lawande et al. |
| 5,950,011 | A | 9/1999 | Albrecht et al. | 6,219,756 B1 | 4/2001 | Kasamizugami |
| 5,950,131 | A | 9/1999 | Vilmur | 6,219,780 B1 | 4/2001 | Lipasti |
| 5,951,674 | A | 9/1999 | Moreno | 6,223,222 B1 | 4/2001 | Fijolek et al. |
| 5,953,322 | A * | 9/1999 | Kimball .................. 370/328 | 6,226,387 B1 | 5/2001 | Tewfik et al. |
| 5,956,518 | A | 9/1999 | DeHon et al. | 6,230,307 B1 | 5/2001 | Davis et al. |
| 5,956,967 | A | 9/1999 | Kim | 6,237,029 B1 | 5/2001 | Master et al. |

| Patent No. | Date | Inventor(s) |
|---|---|---|
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,279,020 B1 | 8/2001 | Dujardin et al. |
| 6,281,703 B1 | 8/2001 | Furuta et al. |
| 6,282,627 B1 | 8/2001 | Wong et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,446,258 B1 | 9/2002 | McKinsey et al. |
| 6,449,747 B2 | 9/2002 | Wuytack et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,476,636 B1 * | 11/2002 | Lien et al. .................... 326/41 |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B2 | 1/2004 | Barroso et al. |
| 6,675,284 B1 | 1/2004 | Warren |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,718,541 B2 | 4/2004 | Ostanevich et al. |
| 6,721,286 B1 | 4/2004 | Williams et al. |
| 6,721,884 B1 | 4/2004 | De Oliveira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,854,002 B2 | 2/2005 | Conway et al. |
| 6,859,434 B2 | 2/2005 | Segal et al. |
| 6,865,664 B2 | 3/2005 | Budrovic |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 | 1/2006 | Master et al. |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 * | 5/2006 | Leem ........................ 434/156 |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |

| | | | | | | |
|---|---|---|---|---|---|---|
| 2002/0072830 | A1 | 6/2002 | Hunt | EP | 0 236 633 B1 | 5/1991 |
| 2002/0078337 | A1 | 6/2002 | Moreau et al. | EP | 0 478 624 B1 | 4/1992 |
| 2002/0083305 | A1 | 6/2002 | Renard et al. | EP | 0 479 102 A2 | 4/1992 |
| 2002/0083423 | A1 | 6/2002 | Ostanevich et al. | EP | 0 661 831 A2 | 7/1995 |
| 2002/0087829 | A1 | 7/2002 | Snyder et al. | EP | 0 668 659 A2 | 8/1995 |
| 2002/0089348 | A1 | 7/2002 | Langhammer | EP | 0 690 558 A2 | 1/1996 |
| 2002/0101909 | A1 | 8/2002 | Chen et al. | EP | 0 691 754 A2 | 1/1996 |
| 2002/0107905 | A1 | 8/2002 | Roe et al. | EP | 0 768 602 A2 | 4/1997 |
| 2002/0107962 | A1 | 8/2002 | Richter et al. | EP | 0 817 003 A2 | 1/1998 |
| 2002/0119803 | A1 | 8/2002 | Bitterlich et al. | EP | 0 821 495 A2 | 1/1998 |
| 2002/0120672 | A1 | 8/2002 | Butt et al. | EP | 0 866 210 A2 | 9/1998 |
| 2002/0133688 | A1 | 9/2002 | Lee et al. | EP | 0 923 247 A2 | 6/1999 |
| 2002/0138716 | A1 | 9/2002 | Master et al. | EP | 0 926 596 A2 | 6/1999 |
| 2002/0141489 | A1 | 10/2002 | Imaizumi | EP | 1 056 217 A2 | 11/2000 |
| 2002/0147845 | A1 | 10/2002 | Sanchez-Herrero et al. | EP | 1 061 437 A1 | 12/2000 |
| 2002/0159503 | A1 | 10/2002 | Ramachandran | EP | 1 061 443 A2 | 12/2000 |
| 2002/0162026 | A1 | 10/2002 | Neuman et al. | EP | 1 126 368 A2 | 8/2001 |
| 2002/0167997 | A1 | 11/2002 | Kim et al. | EP | 1 150 506 A2 | 10/2001 |
| 2002/0168018 | A1 | 11/2002 | Scheuermann | EP | 1 189 358 A1 | 3/2002 |
| 2002/0181559 | A1 | 12/2002 | Heidari-Bateni et al. | GB | 2 067 800 A | 7/1981 |
| 2002/0184275 | A1 | 12/2002 | Dutta et al. | GB | 2 237 908 A | 5/1991 |
| 2002/0184291 | A1 | 12/2002 | Hogenauer | JP | 62-249456 | 10/1987 |
| 2002/0184498 | A1 | 12/2002 | Qi | JP | 63-147258 | 6/1988 |
| 2002/0191790 | A1 | 12/2002 | Anand et al. | JP | 4-51546 | 2/1992 |
| 2003/0007606 | A1 | 1/2003 | Suder et al. | JP | 7-064789 | 3/1995 |
| 2003/0012270 | A1 | 1/2003 | Zhou et al. | JP | 7066718 | 3/1995 |
| 2003/0018446 | A1 | 1/2003 | Makowski et al. | JP | 10233676 | 9/1998 |
| 2003/0018700 | A1 | 1/2003 | Giroti et al. | JP | 10254696 | 9/1998 |
| 2003/0023649 | A1 | 1/2003 | Kamiya et al. | JP | 11296345 | 10/1999 |
| 2003/0023830 | A1 | 1/2003 | Hogenauer | JP | 2000315731 | 11/2000 |
| 2003/0026242 | A1 | 2/2003 | Jokinen et al. | JP | 2001-053703 | 2/2001 |
| 2003/0030004 | A1 | 2/2003 | Dixon et al. | WO | WO 89/05029 A1 | 6/1989 |
| 2003/0046421 | A1 | 3/2003 | Horvitz et al. | WO | WO 89/11443 A2 | 11/1989 |
| 2003/0050055 | A1* | 3/2003 | Ting et al. .................. 455/419 | WO | WO 91/00238 A1 | 1/1991 |
| 2003/0061260 | A1 | 3/2003 | Rajkumar | WO | WO 93/13603 A1 | 7/1993 |
| 2003/0061311 | A1 | 3/2003 | Lo | WO | WO 95/11855 A1 | 5/1995 |
| 2003/0063656 | A1 | 4/2003 | Rao et al. | WO | WO 96/33558 A1 | 10/1996 |
| 2003/0074473 | A1 | 4/2003 | Pham et al. | WO | WO 98/32071 A3 | 7/1998 |
| 2003/0076815 | A1 | 4/2003 | Miller et al. | WO | WO 99/03776 A1 | 1/1999 |
| 2003/0099223 | A1 | 5/2003 | Chang et al. | WO | WO 99/21094 A2 | 4/1999 |
| 2003/0102889 | A1 | 6/2003 | Master et al. | WO | WO 99/26860 A1 | 6/1999 |
| 2003/0105949 | A1 | 6/2003 | Master et al. | WO | WO 99/65818 A1 | 12/1999 |
| 2003/0110485 | A1 | 6/2003 | Lu et al. | WO | WO 00/19311 A1 | 4/2000 |
| 2003/0142818 | A1 | 7/2003 | Raghunathan et al. | WO | WO 00/65855 A1 | 11/2000 |
| 2003/0154357 | A1 | 8/2003 | Master et al. | WO | WO 00/69073 A1 | 11/2000 |
| 2003/0163723 | A1 | 8/2003 | Kozuch et al. | WO | WO 01/11281 A1 | 2/2001 |
| 2003/0172138 | A1 | 9/2003 | McCormack et al. | WO | WO 01/22235 A1 | 3/2001 |
| 2003/0172139 | A1 | 9/2003 | Srinivasan et al. | WO | WO 01/76129 A2 | 10/2001 |
| 2003/0200538 | A1 | 10/2003 | Ebeling et al. | WO | WO 02/12978 A2 | 2/2002 |
| 2003/0212684 | A1 | 11/2003 | Meyer et al. | | | |
| 2003/0229864 | A1 | 12/2003 | Watkins | | | |
| 2004/0006584 | A1 | 1/2004 | Vandeweerd | | | |
| 2004/0010645 | A1 | 1/2004 | Scheuermann et al. | | | |
| 2004/0015970 | A1 | 1/2004 | Scheuermann | | | |
| 2004/0015973 | A1 | 1/2004 | Skovira | | | |
| 2004/0025159 | A1 | 2/2004 | Scheuermann et al. | | | |
| 2004/0057505 | A1 | 3/2004 | Valio | | | |
| 2004/0062300 | A1 | 4/2004 | McDonough et al. | | | |
| 2004/0081248 | A1 | 4/2004 | Parolari | | | |
| 2004/0086027 | A1 | 5/2004 | Shattil | | | |
| 2004/0093479 | A1 | 5/2004 | Ramchandran | | | |
| 2004/0168044 | A1 | 8/2004 | Ramchandran | | | |
| 2004/0174932 | A1 | 9/2004 | Warke et al. | | | |
| 2005/0044344 | A1 | 2/2005 | Stevens | | | |
| 2005/0166038 | A1 | 7/2005 | Wang et al. | | | |
| 2005/0190871 | A1 | 9/2005 | Sedarat | | | |
| 2005/0198199 | A1 | 9/2005 | Dowling | | | |
| 2006/0031660 | A1 | 2/2006 | Master et al. | | | |

FOREIGN PATENT DOCUMENTS

| | | |
|---|---|---|
| EP | 0 301 169 A1 | 2/1989 |
| EP | 0 166 586 B1 | 1/1991 |

OTHER PUBLICATIONS

Andraka Consulting Group, "Distributed Arithmetic," Obtained from: http://www.fpga-guru.com/distribu.htm (1998-2000).

Free On-Line Dictionary of Computing. ©1995-2000 www.foldoc.org search terms: cache, operating system, Internet, DMA, interrupt.

Hanna et al., "A Normalized Backpropagation Learning Algorithm for Multilayer Feed- Forward Neural Adaptive Filters," *Neural Networks for Signal Processing XI*, Proceedings of the 2001 IEEE Signal Processing Society Workshop pp. 63-72 (Sep. 2001).

Janweijer et al., "A Compact Robin Using the SHarc (CRUSH)," Obtained from: http://www.nikhef.nl/~peterj/Crush/Crush-hw.pdf (Sep. 1998).

Rajagopalan et al., "A Flexible Multiplication Unit for an FPGA Logic Block," *Circuits and Systems* 4:546-9 (2001).

Röch et al., "Some New Results in Flow Shop Scheduling," *Zeitschrift für Operations Research* 28:1-116 (1983).

Verhoosel et al., "A Static Scheduling Algorithm for Distributed Hard Real-Time Systems," *Journal of Real-Time Systems* 3:227-46 (1991).

Xilinx Data Book 1998.

Xilinx Virtex 1.1 1998.

Xilinx Virtex 2.2 2000.

Xu et al., "Scheduling Processes with Release Times, Deadlines, Predence, and Exclusion Relations," IEEE Transactions on Software Engineering 16(3):360-9 (Mar. 1990).

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

Aggarwal et al.., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformations for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A MATLAB Compiler for Distributed, Heterogeneous, Reconfigurable Computing Systems," 2000 IEEE Symposium, pp. 39-48, (Apr. 17-19, 2000).

Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).

Baumgarte et al., "Pact XPP—A Self-Reconfigurable Data Processing Architecture," NN www.pactcorp.com/sneu/download/ersa01.pdf; retrieved on Nov. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).

Bevstar, BevStar Bottled Water Model Advertisement *Automatic Merchandiser* at www.AMonline.com (2005).

Bevstar., BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for Heterogeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 166-175 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systems p. 8, ACM (Cases '00, San Jose, CA) (Nov. 17-18, 2000).

Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (Micro) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine . 37(2):108-112 (Feb. 1999).

Dandalis et al., "An Adaptive Cryptograhic Engine for IPSec Architectures," IEEE pp. 132-141 (Jan. 2000).

David et al., "Dart: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms," 9th International Conference on Electronics, Circuits and Systems IEEE (2002).

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).

Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger, "A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language Lustre," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, NJ, US, IEEE, pp. 564-569 (Jan. 30, 2001).

Heinz, "An Efficiently Compilable Extension of {M} odula-3 for Problem-Oriented Explicitly Parallel Programming," Proceedings of the Joint Symposium on Parallel Processing (May 1993).

Hinden et al., "The DARPA Internet: Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Language, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al, "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation on Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-69 (Aug. 2003).

Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).

Openmp Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org.3125/citeseer.ist.psu.edu/cache/papers/cs/17524/http:zSzzSzmaarcii.usc.eduzSzPublicationsZSzsidhu__fp100.pdf/sidhu00selfreconfigurable.pdf retrieved on Jun. 21, 2006 (Sep. 1, 2001).

Smith, "Intro to ASICs: ASIC Cell Libraries," at http://iroi.seu.edu.cn/books/asics/Book2/CH01/CH01.5.htm, printed on Feb. 4, 2005 (Jun. 1997).

Souza, " Computing's New Face—Reconfigurable Devices Could Rattle Supply Chain," Electronic Buyers' News Issue 1205, p. P.1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chiefs Latest Daft Idea—A Cola Tap in Every House," Sunday Times (Mar. 2001).

Sun Microsystems, "Fortran 3.0.1 User's Guide, Revision A," pp. 57-68 (Aug. 1994).

Svensson, "Co's Join on Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; Rice University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.COM, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sept. 2001).

Zhang et al., "A 1V Heterogeneous Reconfigurable Processor IC for Baseband Wifeless Applications," 2000 IEEE Solid.

* cited by examiner

SYSTEM FOR ADAPTING DEVICE STANDARDS AFTER MANUFACTURE

CROSS-REFERENCE TO RELATED APPLICATIONS

This application is related to the following co-pending applications:

(1) U.S. patent application Ser. No. 09/815,122, filed on Mar. 22, 2001, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS;" and (2) U.S. patent application Ser. No. 09/998,006, filed on Nov. 28, 2001, entitled "SYSTEM FOR AUTHORIZING FUNCTIONALITY IN CONFIGURABLE HARDWARE DEVICES".

Each of the above applications are hereby incorporated by reference as if set forth in full in this document.

BACKGROUND OF THE INVENTION

This invention relates in general to adapting hardware devices to achieve desired functionality and more specifically to adapting a hardware device at, or prior to, the time of sale.

Traditional consumer electronic devices have substantially fixed functionality. Devices such as cell phones, digital audio players, personal digital assistants (PDAs), global positioning satellite (GPS) terminals, etc. are designed, manufactured and marketed as a specific type of device with a specific feature set. Typically, a manufacturer of a new device makes decisions at the very outset of design or manufacturing as to what functions the device will perform, which standards (e.g., communication transfer standard, data format standard, etc.) the device will be compatible with, etc. This requires selection of appropriate integrated circuit (IC) chips, or the design of new chips and circuitry. Where standards are followed, royalty payments must be paid to the standard's creator, consortium, or other organization or entity that owns the standard. Such royalty, or other, payment can be a significant part of the overall cost of manufacturing the device.

A next step in manufacturing the device is the "board-level" design and assembly. The IC chips are arranged with other circuitry, user controls, connectors, etc., on a singular assembly such as a printed-circuit (PC) board. Typically, a new design is needed for each new device as different chips and other components are being used.

Next, a chassis designer and manufacturer is used to create and enclose the assembly in a housing, or shell. Again, this is a customized step as the packaging for a new board assembly is usually unique. After the assembly is incorporated into the housing package the device is physically completed.

There may be one or more levels of distribution of the device. A manufacturer can ship to a wholesale distributor. The wholesale distributor can then ship to retail distributors. The retail distributors can ship to retail sellers. Finally, a consumer purchases and obtains the device.

Figure 1A:
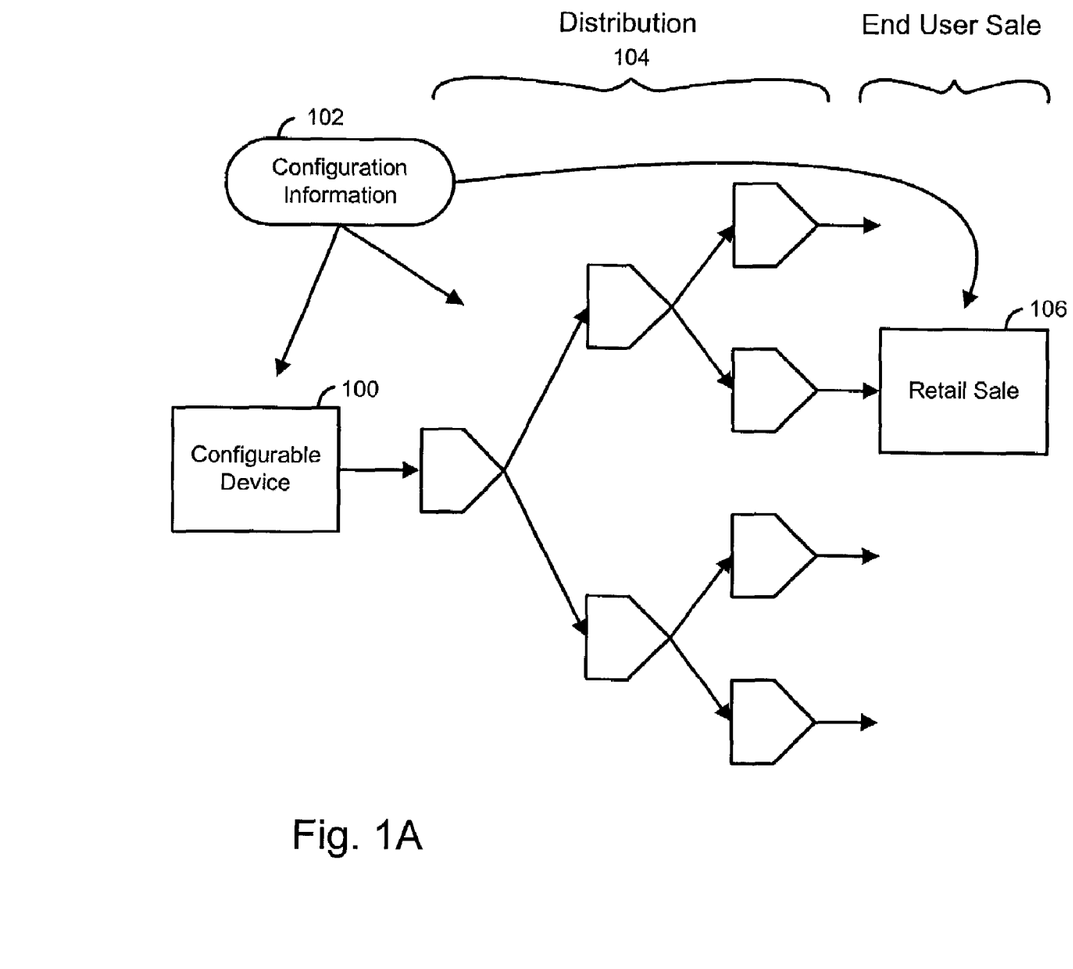
FIG. 1A illustrates an adaptable device's adaptation, distribution and sale according to the present invention.
Figure 1B:
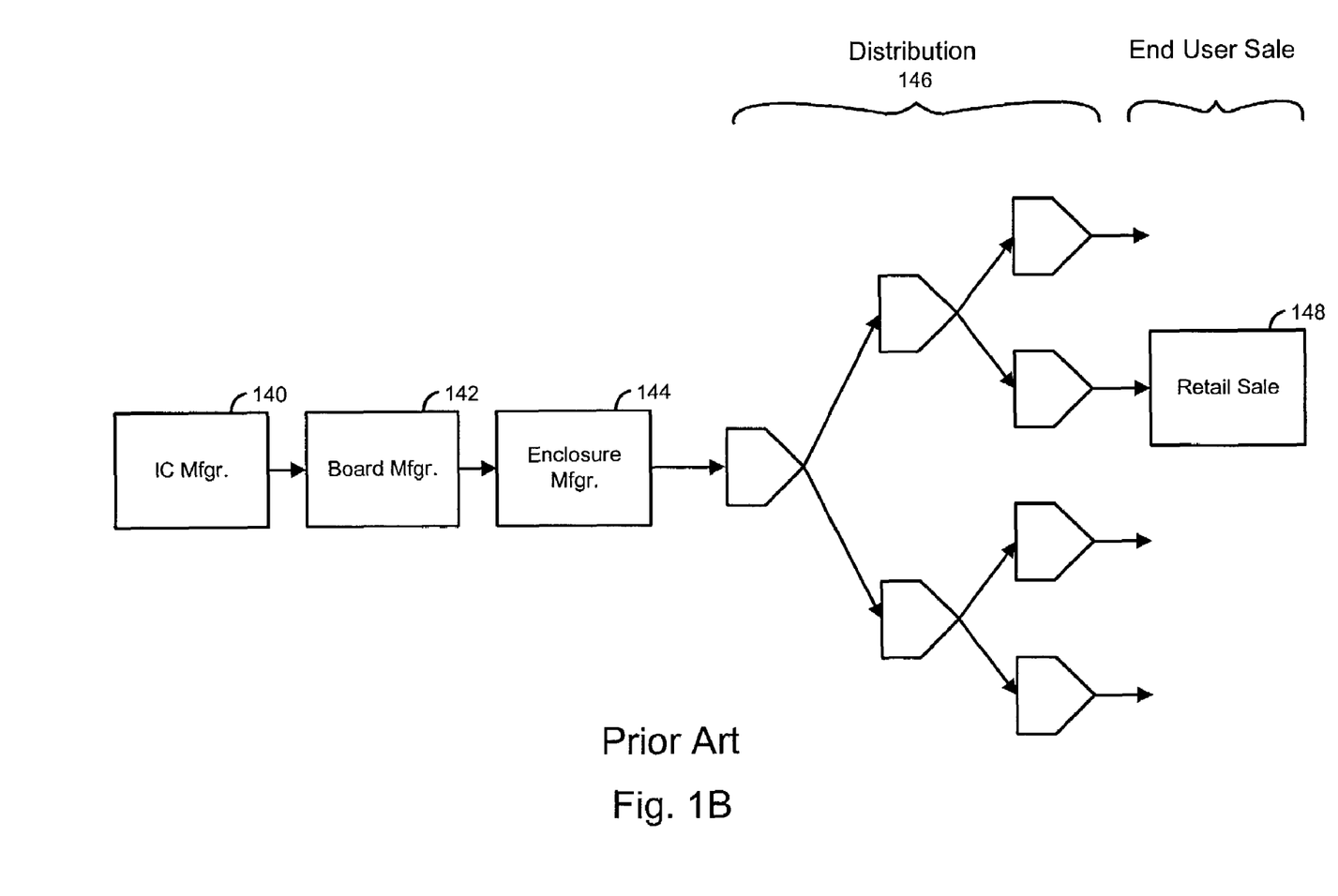
FIG. 1B illustrates typical entities involved in the development, sale, distribution and adaptation of an electronic device.

FIG. 1B illustrates a prior art approach to manufacturing, distributing and selling an electronic device.

In FIG. 1B, a device manufacturer commissions an integrated circuit (IC) manufacturer, or foundry, to fabricate custom ICs, or chips, according to the manufacturer's designs. Such chips can include application-specific integrated circuit (ASIC), programmable gate array (PGA), or other design approaches. IC manufacturer 140 then provides the chips to the device manufacturer or to board-level manufacturer 142.

Board-level manufacturer 142 combines components onto one or more circuit assemblies. Typically, this is a printed circuit board (PCB) but any other type of circuit assembly is possible. The circuit assembly is sent to enclosure manufacturer 144 where the final assembly and testing of the device is performed.

Then the electronic device is subjected to a large-scale distribution network. Distribution network 146 represents any delivery, storage and sales facility that might be used to disseminate the product. For example, shipping, warehousing, wholesale and other sales outlets can be used. Furthermore, the distribution can include Internet, mail, telephone, or other services. Ultimately, the product is provided to an end user, or consumer, via a sales endpoint such as retail sales point 148. A retail sales point can be a physical or e-commerce store, catalog sales order, online auction, etc.

Each step of the above manufacturing and distribution scenario adds cost to the device. Further, the design steps are usually repeated completely anew for subsequent devices. There is very little advantage to prior development and design for new products since typical consumer electronics technology changes so rapidly.

Another problem with the prior art design and distribution system is that some standards for consumer electronics devices are owned by one, or a few, companies. These companies are in a position to charge large payments. Manufacturers of new devices must determine, and put agreements in place to pay for, the standards to be used in the device from the very beginning of the design cycle. Thus, the manufacturer is not in a strong position to decide which standard to use based on consumer demand, or popularity, near the time of sale of the device. Owners, or licensors, of standards typically do not have to compete against each other in a "free-market" where prices are closely tied to supply and demand. This results in devices that cost more due to the relatively fixed, high, royalty payments. This hurts consumers' ability to make decisions on the type of standard to follow and to obtain the best price on a device that uses a particular standard.

Thus, it is desirable to provide a system that alleviates one or more shortcomings in the prior art.

SUMMARY OF THE INVENTION

The present invention provides a system for efficient sale of devices that comply with licensed standards. A preferred embodiment of the invention uses a generic, or highly adaptable, hardware device. The device can be adapted to adhere to a specific standard, e.g., code-division multiple access (CDMA), time-division multiple access (TDMA), etc., after manufacture such as at the point-of-sale to an end user, prior to distribution, or at some other point in a distribution and sales network. This allows manufacturers, retailers and end users to benefit from more competitive selection of standardized communication, data and other formats. Reduction of manufacturing costs and elimination of shipping, or other transfer and storage costs, is also realized.

In one embodiment the invention provides a method for allowing an adaptable electronic device to be adapted prior to sale to an end user, wherein the device is sold by a retailer, the method comprising the following steps performed by the retailer: obtaining an order for a device with first functionality; adapting the device with the first functionality; and selling the device with the first functionality to an end user.

DESCRIPTION OF A PREFERRED EMBODIMENT

The present invention provides for adapting a device to comply with popular standards used in commercial consumer electronic devices. Although the present application is presented primarily with respect to consumer electronic devices and relevant standards, aspects of the invention can be used with other types of electronic devices and other standards, licensed technology or functionality.

A preferred embodiment of the invention provides for adapting the electronic device at, or near, the point of consumer sale.

FIG. 1A illustrates adaptation, distribution and sale of an adaptable device according to the present invention.

In FIG. 1A, an adaptable device is initially provided to a distribution network by an original manufacturer of the device represented by adaptable device 100. A preferred embodiment of the invention uses a device including an adaptive computing engine (ACE) that is described in detail in the co-pending patent application referenced above, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS." It should be apparent that any type of adaptable hardware device design is adaptable for use with the present invention. For example, the adaptable device can be any type of adaptable device using other architectures or design methodologies, such as a device using a general-purpose processor, multiprocessing, application-specific integrated circuit (ASIC), field-programmable gate array (FPGA), dedicated circuitry, etc., or combination of the foregoing.

The adaptable device can be adapted with a desired standard, or other functionality, at the point of initial shipping of the device. This is represented in FIG. 1A by an arrow from adaptation information 102 to adaptable device 100. The device can be adapted by adaptation information loaded into the device by any type of communication means such as reading magnetic media, using a digital network such as a local-area network (LAN), the Internet; using a hardwire transfer, using optical or radio-frequency communication, etc.

Some types of standards to which the device can be adapted to use include data formats and communication standards. For example, where a device is intended to perform a cellular telephone function, standards such as TDMA, CDMA, voice-over internet protocol (VoIP), analog, digital satellite, or other standards can be employed. Where a device is an audio playback device, formats such as Moving Pictures Expert's Group (MPEG) version 3, RealNetworks' "RealAudio" (.ra), Quicktime's (.mov), digital audio (.wav), Microsoft Media Player (.au) or other formats can be used. Where a device is a global positioning system (GPS) receiver the appropriate standards can be used. Many other types of standards and functionality can be suitable for use with the present invention.

Adaptation of the device can include the means described in co-pending U.S. Patent Application entitled "SYSTEM FOR AUTHORIZING FUNCTIONALITY IN ADAPTABLE HARDWARE DEVICES," referenced, above.

FIG. 1A shows distribution network 104. Distribution network 104 can include various entities and mechanisms for the sale, transfer and storage of devices. For example, distribution network 104 can include shipping and warehousing facilities; wholesalers, a return and refurbishing network, etc. The distribution network culminates in an end user, or consumer, sale of the device such as at retail sale point 106.

The present invention provides for the devices to be adapted at any point in distribution network 104 or at a retail sale point such as retail sale point 106. Note that such an approach provides advantages in quickly meeting consumer demand for specific types of devices. For example, if demand for TDMA cellular phones suddenly increases. There is no need for remanufacture and redistribution of TDMA-designed devices. The devices can merely be adapted as TDMA devices anywhere in the various entities (i.e., manufacturer, distributor or sales) of FIG. 1A.

The invention provides for very quick distribution since devices can be in warehouses, or even on retail store shelves, and can be reconfigured in short time. One approach allows adaptation of devices stored in warehouses to be driven by retailer demand. Thus, retailers place orders for certain devices from wholesalers. Adaptation of the devices is performed at, or by, wholesalers to meet retailer demand. Naturally, adaptation can be performed by other entities, including the retailers, themselves. Another approach allows adaptation of devices to be driven by consumer demand. In this case retailers, or any other entity can perform the adaptation.

Traditional forms of selling, renting, leasing, or contractual or licensing arrangements can be used in connection with the adaptation of devices. For example, adaptation information 102 can be provided by a primary company that is the manufacturer of the devices. The primary company can charge for transferring, or otherwise providing, the adaptation information. Adaptation information can acquire properties of prior art devices in that it can be tracked, wholesaled and retailed. The advantage is that the cost to ship the adaptation information is virtually nothing. Thus, the use of pre-sale adaptation of electronic devices prior to the point of sale attains a "virtual device" that can be instantly shipped to locations where the physical adaptable, "generic," device is already present.

Naturally, the adaptation information can be transferred to a location prior to, or in the absence of, actual devices being present at the location. The adaptation information can be stored and used at a later time.

Figure 2:
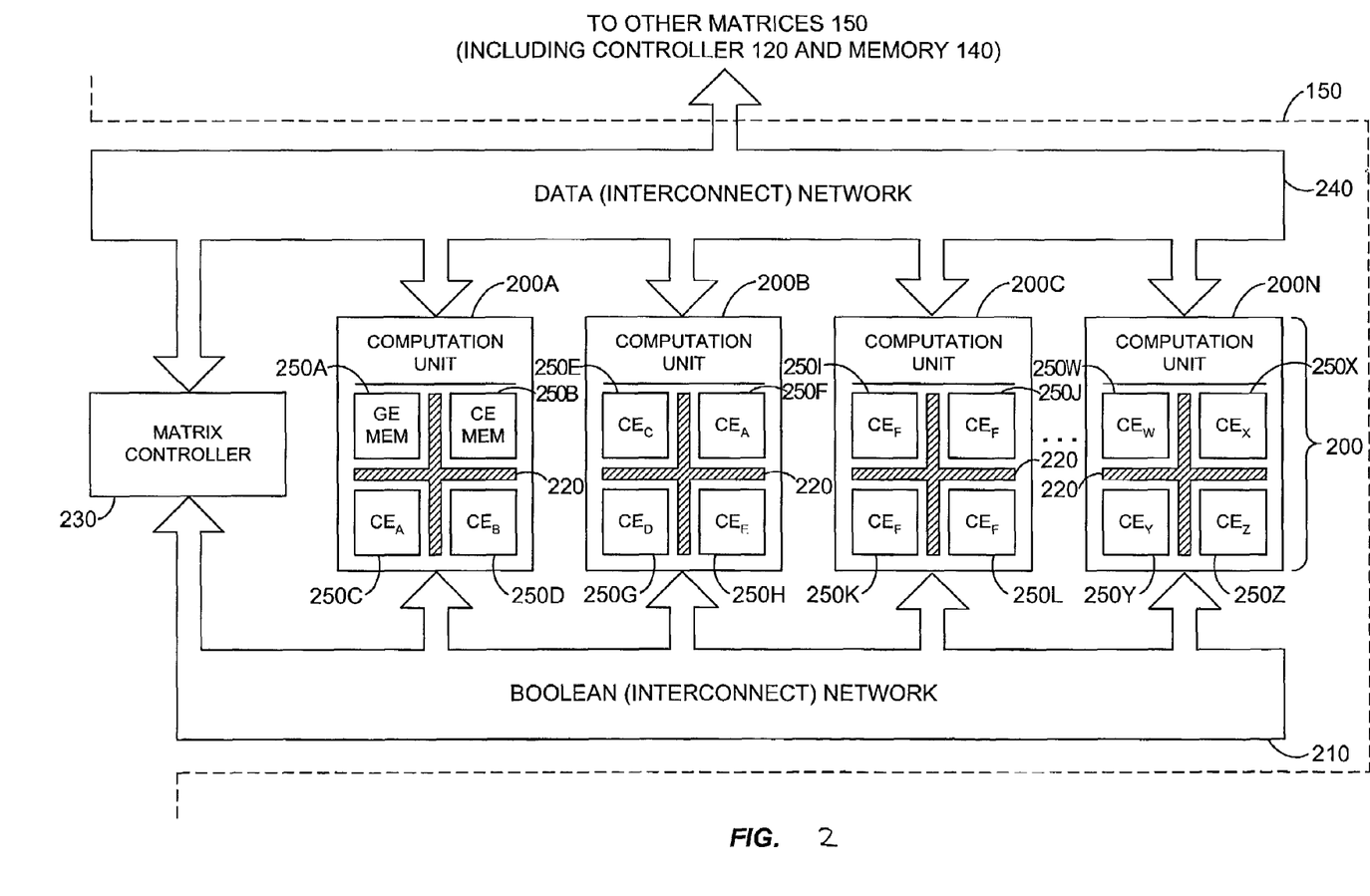
FIG. 2 illustrates basic parts of an adaptable device architecture based on an adaptive computing environment.

FIG. 2 illustrates basic parts of an adaptable device architecture based on an adaptive computing environment (ACE) approach. Such an approach is discussed in detail in the co-pending patent application referenced, above. The ACE architecture uses small processing elements called nodes, or matrices. The matrices are each designed to be specialized in one basic type of processing such as arithmetic, bit manipulation, finite state machine, memory oriented or reduced instruction set computing (RISC) approaches. The matrices are provided with adaptable interconnection networks. A scheduler performs the task of mapping an operation, or function, onto the matrices. Once mapped, the function can execute for a while before a next function is mapped onto the same set of matrices. In this manner, the functionality of a device that includes the matrices can be changed quickly and efficiently.

In FIG. 2, adaptable matrix 150 includes a plurality of computation units 200 (illustrated as computation units 200A through 200N). Computation units include a plurality of computational elements 250 (illustrated as computational elements 250A through 250Z). As illustrated in FIG. 2, matrix 150 generally includes a matrix controller 230 and plurality of computation (or computational) units 200 as logical or conceptual subsets or portions of a matrix interconnect network. Also shown are data interconnect network 240 and Boolean interconnect network 210. Interconnect networks can have different levels of interconnectivity and flexibility for greater levels of adaptability and adaptation. In an applied architecture, the matrix represented by FIG. 2 is replicated within a single chip, or chipset, and interconnected with each other to provide a scalable approach to providing processing resources. A network interconnecting matrices (not shown) is referred to as a matrix interconnection network.

Boolean interconnect network 210 provides adaptation and data interconnection capability between and among the various computation units 200, and is preferably small (i.e., only a few bits wide). Data interconnect network 240 provides the adaptation and data interconnection capability for data input and output between and among the various computation units 200, and is preferably comparatively large (i.e., many bits wide). It should be noted, however, that while conceptually divided into adaptation and data capabilities, any given physical portion of the matrix interconnection network, at any given time, may be operating as either the Boolean interconnect network 210, the data interconnect network 240, the lowest level interconnect 220 (between and among the various computational elements 250), or other input, output, or connection functionality.

Continuing to refer to FIG. 2, included within a computation unit 200 are a plurality of computational elements 250, illustrated as computational elements 250A through 250Z (individually and collectively referred to as computational elements 250), and additional interconnect 220. The interconnect 220 provides the adaptable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be adaptably connected together into adaptive and varied computational units 200, which also may be further adapted and interconnected, to execute an algorithm or other function, at any given time, utilizing the interconnect 220, the Boolean network 210, and the matrix interconnection network (not shown).

In a preferred embodiment, the various computational elements 250 are designed and grouped together, into various adaptive and adaptable computation units 200. In addition to computational elements 250 which are designed to execute a particular algorithm or function, such as multiplication or addition, other types of computational elements 250 are also utilized. As illustrated in FIG. 2, computational elements 250A and 250B implement memory, to provide local memory elements for any given calculation or processing function (compared to more "remote" or auxiliary memory that can be external to the matrix). In addition, computational elements 250I, 250J, 250K and 250L are adapted to implement finite state machines to provide local processing capability especially suitable for complicated control processing.

With the various types of different computational elements 250 that may be available, depending upon the desired functionality, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A. Lastly, a fifth type of computation unit 200 may be included to perform bit-level manipulation, such as for encryption, decryption, channel coding, Viterbi decoding, and packet and protocol processing (such as Internet Protocol processing).

In addition to the ways of determining functionality for general-purpose processing devices, as described above, the functionality of a device using the ACE architecture can be determined by adaptation information that is used to schedule operations on the computation units. Usage information can include the availability, types and frequency of use of different computation units. Adaptation of the interconnect network, number of active computation units over time, rate of execution of operations, etc., can all be used as usage parameters.

Although the invention has been described with respect to specific embodiments, the embodiments are merely illustrative, and not restrictive, of the invention. For example, adaptable devices can already be adapted with specific functionality and/or standards prior to adapting, or re-adapting the devices prior to the point of sale.

Thus, the scope of the invention is to be determined solely by the appended claims.

What is claimed is:

1. A method for allowing an adaptable electronic device to be adapted prior to sale to an end user, the device including adaptive hardware having a first heterogeneous configurable computational unit having a first computational architecture including a first plurality of computing elements and an interconnection network with interconnections between the first plurality of computing elements, the interconnection network allowing simultaneously sending different configuration information to the interconnections between the first plurality of computing elements, and a second heterogeneous configurable computational unit having a second computational architecture different from the first computational architecture of the first computational unit, the second computational architecture including a second plurality of computing elements coupled to a second interconnection network having interconnections between the second plurality of computing elements, wherein the device is sold by a retailer, the method comprising:

obtaining an order for the device with a functionality;

adapting the device with the functionality by sending configuration information to the interconnection networks to configure the interconnections between at least some of the first and second plurality of computing elements to configure the first and second computational units to perform the functionality; and selling the device with the functionality to an end user.

2. The method of claim 1, wherein the device is a cellular telephone, and adapting includes adapting the device to achieve a code-division multiple access (CDMA) communications standard.

3. The method of claim 1, wherein the device is a cellular telephone, and wherein the adapting includes adapting the device to achieve a time-division multiple access (TDMA) communications standard.

4. The method of claim 1, wherein the device is a cellular telephone, and wherein the adapting includes adapting the device to achieve a voice over internet protocol communications standard.

5. The method of claim 1, wherein the adapting further comprises adapting the device with a data format standard.

6. The method of claim 1, wherein the adapting further comprises adapting the device with a communications standard.

7. The method of claim 1, wherein the device is an audio playback device, and wherein the adapting includes adapting the device to use MPEG-3 (MP3) decoding.

8. The method of claim 1, wherein the device is a cellular telephone, and wherein the adapting includes adapting the device to use RealAudio decoding.

9. The method of claim 1, wherein the device is a cellular telephone, and wherein the adapting includes adapting the device to use Windows Media Player decoding.

10. The method of claim 1, wherein the device is a cellular telephone, and the adapting includes adapting the device to achieve one of a code-division multiple access (CDMA) communications standard, a time-division multiple access (TDMA) communications standard, a voice over internet protocol communications standard, use of RealAudio decoding, or use of Windows Media Player decoding.

11. A product distribution network for configuring an adaptable electronic device prior to sale to an end user, the device including adaptive hardware having a first heterogeneous configurable computational unit having a first computational architecture including a first plurality of computing elements and an interconnection network with interconnections between the first plurality of computing elements, the interconnection network allowing simultaneously sending different configuration information to the interconnections between the first plurality of computing elements, and a second heterogeneous configurable computational unit having a second computational architecture different from the first computational architecture of the first computational unit, the second computational architecture including a second plurality of computing elements coupled to a second interconnection network having interconnections between the second plurality of computing elements, the network comprising:

an order interface to receive an order for the device with a functionality;

a device interface couplable to the device, the device interface sending configuration information to the interconnection networks of the computational units to configure the interconnections between at least some of the first and second plurality of computing elements to configure the first and second computational units to perform the functionality; and a retail sale point to sell the device configured to perform the functionality to an end user.

12. The network of claim 11, wherein the device is a cellular telephone, and the functionality includes conforming to a code-division multiple access (CDMA) communications standard.

13. The network of claim 11, wherein the device is a cellular telephone, and the functionality is conforming to a time-division multiple access (TDMA) communications standard.

14. The network of claim 11, wherein the device is a cellular telephone, and the functionality is conforming to a voice over internet protocol communications standard.

15. The network of claim 11, wherein the device is a cellular telephone, and the functionality is using RealAudio decoding.

16. The network of claim 11, wherein the device is a cellular telephone, and the functionality is using Windows Media Player decoding.

17. The network of claim 11, wherein the functionality is conforming to a data format standard.

18. The network of claim 11, wherein the functionality is conforming to a communications standard.

19. The network of claim 11, wherein the device is an audio playback device, and wherein the functionality is MPEG-3 decoding.

20. A method for allowing an adaptable electronic device to be adapted prior to sale to an end user, the device including a first heterogeneous configurable computational unit having a first computational architecture including a first plurality of computing elements and an interconnection network with interconnections between the first plurality of computing elements, the interconnection network allowing simultaneously sending different configuration information to the interconnections between the first plurality of computing elements, and a second heterogeneous configurable computational unit having a second computational architecture different from the first computational architecture of the first computational unit, the second computational architecture including a second plurality of computing elements coupled to a second interconnection network having interconnections between the second plurality of computing elements, the method comprising:

obtaining an order for a device with a desired functionality;

adapting the device with the desired functionality by sending first configuration information to the interconnection networks to configure a first set of interconnections between a first group of the first and second plurality of computing elements to perform a first operation of the desired functionality and simultaneously sending second configuration information to the interconnection network to configure a second set of interconnections between a second group of the first and second plurality of computing elements to perform a second operation of the desired functionality; and selling the adapted device with the desired functionality to an end user.

* * * * *

UNITED STATES PATENT AND TRADEMARK OFFICE
CERTIFICATE OF CORRECTION

PATENT NO.      : 7,602,740 B2                                        Page 1 of 1
APPLICATION NO. : 10/013825
DATED           : October 13, 2009
INVENTOR(S)     : Master et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1738 days.

Signed and Sealed this

Fifth Day of October, 2010

David J. Kappos
*Director of the United States Patent and Trademark Office*